A. S. CUBITT.
AUTOMATIC REGULATOR FOR ELECTRIC CIRCUITS.
APPLICATION FILED DEC. 14, 1908.
1,121,983.
Patented Dec. 22, 1914.
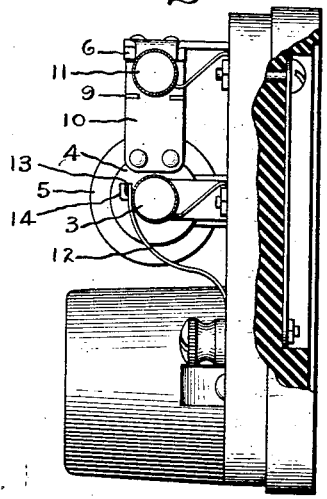
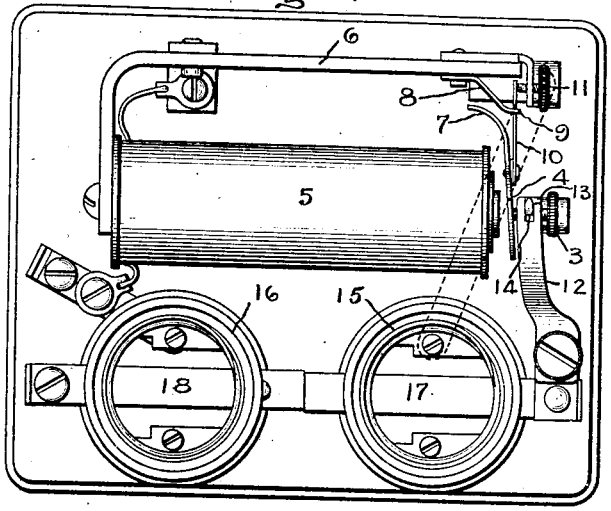
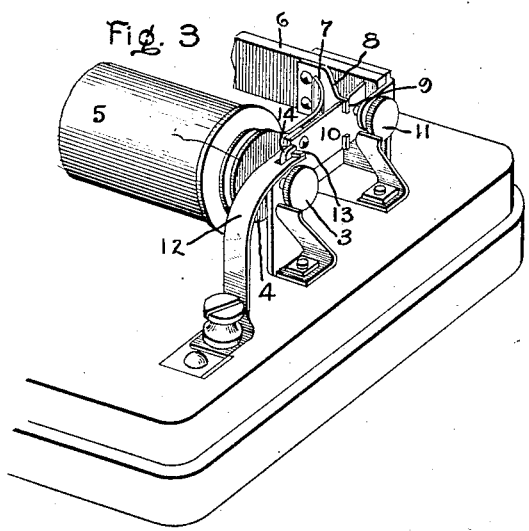
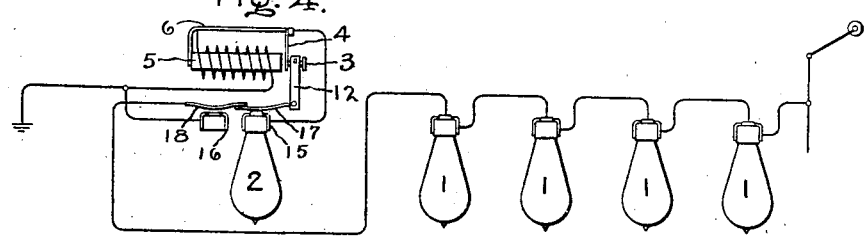
WITNESSES:
Chester H. Fulmer.
J. Ellis Glen.
INVENTOR
ARCHIBALD S. CUBITT.
BY Albert G. Davis
ATT'Y.

UNITED STATES PATENT OFFICE.

ARCHIBALD S. CUBITT, OF SCHENECTADY, NEW YORK, ASSIGNOR TO GENERAL ELECTRIC COMPANY, A CORPORATION OF NEW YORK.

AUTOMATIC REGULATOR FOR ELECTRIC CIRCUITS.

1,121,983.      Specification of Letters Patent.      Patented Dec. 22, 1914.

Application filed December 14, 1908. Serial No. 467,505.

*To all whom it may concern:*

Be it known that I, ARCHIBALD S. CUBITT, a subject of the King of Great Britain, residing at Schenectady, in the county of Schenectady, State of New York, have invented certain new and useful Improvements in Automatic Regulators for Electric Circuits, of which the following is a specification.

My invention relates to regulators for automatically controlling electric circuits and more particularly to regulators similar to the Tirrill regulator, in which a resistance connected in the circuit is automatically short-circuited at suitable intervals.

The illumination from lamps on street cars and in other similar positions where the voltage applied to the lamps is subject to wide variation has been maintained substantially constant by means of a regulator which intermittently short-circuits some suitable regulating resistance in such a manner that the illumination from the lamps is practically constant in spite of variations in voltage on the line. A lamp may be used as the regulating resistance but the breaking of the lamp filament is apt to result in the destruction of the regulator, because as soon as the regulating resistance is broken the contacts in the short circuit around the resistance are directly in series in the lighting circuit, and the arcing caused by intermittently opening and closing the lighting circuit is usually severe enough to destroy the contacts.

The object of my invention is to protect the regulator in such a manner that the breaking of the regulating resistance will immediately reduce the current through the regulator to such a point that the arcing at the contacts is not destructive, and in the preferred construction the breaking of the resistance results in the regulator being permanently cut out of the lighting circuit. The regulator is generally used on street cars and in similar locations, where it is subjected to severe usage and neglect and a further object of my invention is to provide for the regulator a vibratory armature which has no pivots, which can be easily removed and replaced, and the tension of which can be easily varied to control the action of the regulator.

In carrying out my invention, the regulating resistance is connected in series with the circuit to be regulated, and the vibratory armature of the regulator is arranged to intermittently short-circuit the resistance and thereby control the circuit. Where the regulator is used to control the lighting circuits on street cars, in which five lamps are usually connected in series between the trolley and the ground, one of the lamps is preferably utilized as a regulating resistance and is intermittently short-circuited to maintain constant illumination from the remainder of the lamps regardless of the variations in voltage on the line. The regulator is automatically and permanently cut out of circuit as soon as the regulating resistance or the filament of the regulating lamp is broken, this result being accomplished in any suitable manner, preferably by means of a heat responsive or thermal cutout mounted in such a relation to the vibratory contact that the radiant heat from the arcing at the vibratory contact will cause the cutout to operate and permanently open the circuit in case the arcing at the vibratory contact becomes abnormally severe. The preferred form of thermal cutout comprises a spring blade or similar resilient device normally tending to open the circuit and held in circuit closing position by easily fusible metal placed in such relation to the vibrating contact that when the arcing at the contact becomes abnormal the fusible metal melts and releases the resilient device which then automatically opens the circuit. The action of the armature is improved and the defects of the pivoted armature heretofore used are overcome by details of construction which are more fully hereinafter explained.

My invention will best be understood in connection with the accompanying drawing, which illustrates one of the various forms in which the invention may be embodied and in which—

Figure 1 is a plan view of a regulator embodying my invention; Fig. 2 is an end view of the regulator shown in Fig. 1, with a portion of the base cut away to show the connections; Fig. 3 is a view in perspective showing the vibrating armature and cutout; and Fig. 4 is a diagrammatic view showing the regulator connected in the lighting circuit of the street car.

In the form of invention shown in the drawings, in which it is used for controlling the lighting circuit on a street car, the lamps 1 of the car are connected in series between the trolley and ground through a regulator comprising a regulating resistance 2, which may be of any suitable form, but is preferably an incandescent lamp. The regulating lamp 2 may be short-circuited by means of a low resistance shunt circuit comprising a fixed contact 3 mounted on the base of the regulator and coöperating with a vibratory contact 4 comprising a vibratory armature which, by its vibration, intermittently opens and closes the low resistance shunt circuit around the regulating lamp 2 and thereby intermittently cuts the regulating lamp into and out of circuit with the lamps 1.

As will be apparent from Fig. 4, the connections are so arranged that when the vibratory contact is out of engagement with the fixed contact and the shunt circuit is open, the regulating lamp 2 is in series between the other lamps and the ground; while, when the vibratory contact is in engagement with the fixed contact 3, the current flows through the lamps 1 and then directly through the shunt circuit to the ground. The circuit from both the regulating resistance or lamp 2 and the vibratory contact 4 to the ground is completed through an electromagnet 5 which has its windings upon one leg of a U-shaped yoke 6 of iron. The vibratory contact 4 preferably comprises an armature for the electromagnet 5 mounted, as shown in Figs. 1 and 3, in such a position that it practically completes the magnetic circuit of the electromagnet by substantially closing the gap between the ends of the U-shaped yoke 6. In the preferred construction the armature has a curved end 7 which overlaps and is practically parallel with an iron projection or support 8, mounted upon one leg of the yoke 6 and provided with ears 9 which fit into notches on a spring blade 10 of non-magnetic material, and thereby interlock the support and the spring blade so that the blade cannot be moved lengthwise or laterally but can be moved transversely and lifted out of position between the ears 9 on the support 8. As shown in Figs. 1 and 3, the vibratory contact 4 is formed by riveting one end of the spring blade 10 to the vibratory armature and the other end of the blade is engaged by any suitable stop, such as an adjusting screw 11 threaded into a support on the leg of the yoke 6 and by means of which the spring blade 10 may be strained to hold the armature away from the electromagnet. The fixed contact 3 and the adjusting screw 11 form two stops which engage the vibratory contact on one side and the support or projection 8 forms a third stop which engages the vibratory contact on the other side and between the first two stops. The three stops are in substantial alinement with one another and when the spring blade 10 is sprung into position and interlocked with the projection 8, the blade is securely held against displacement until one of the stops is moved relatively to the others and out of alinement with them. The vibratory contact may be removed by loosening the adjusting screw 11 which allows the spring plate 10 to be moved horizontally clear of the projections 8 after which it may be lifted from the regulator. The strain tending to hold the armature against the fixed contact is adjusted by varying the pressure exerted by the adjusting screw on the end of the spring blade 10, and since the spring blade bends about the support 8 as a fulcrum, the difficulties incident to the use of pivots are avoided.

In a regulator constructed as above described and connected in the circuit as shown in Fig. 4, a relatively high voltage on the line will cause the vibratory contact 4 to close the shunt circuit only at long intervals and then only momentarily, so that the regulating resistance is in series with the lamps 1 practically all the time, while low voltage causes the shunt circuit to be closed practically all the time, whereby full line voltage is applied to the four lamps 1, and when the voltage is between these limits the contact 4 vibrates at a rate and in a manner which keeps the lamps 1 at substantially constant brilliancy. Under all normal conditions, the amount of current which is controlled in the shunt circuit around the regulating resistance is small, but in case the regulating resistance is broken the vibratory contact is thrown into series with the lamps 1 and must then intermittently make and break the lighting circuit while the difference in potential between the contacts 3 and 4 is much higher than when conditions are normal. The intermittent opening and closing of the lighting circuit results in severe and destructive arcing between the two contacts unless some protective device is provided which will act to protect the regulator as soon as the regulating resistance or regulating lamp is broken. Any suitable protective device may be used which is actuated upon the breaking of the regulating resistance to cut the current through the regulator down to such a point that the arcing at the vibratory contact is not destructive. In the preferred construction, a heat responsive or thermal cutout is used for opening the lighting circuit through the regulator and the lamps 1 and is mounted in such relation to the vibratory contact 4 that the heat set up by the excessive arcing at the vibratory contact causes the cutout to act. The preferred form of thermal cutout comprises a resilient spring 12 which is connected in the circuit and is held in circuit closing position by means of a fusible link 13 extending across the ends of a notch in the blade 12 and engaging a hook 14 on the support for the fixed contact 3, thereby maintaining the fixed contact 3 in electrical connection with the regulating resistance or lamp 2 and the other lamps 1. The spring blade 12 normally tends to spring up and thereby open the circuit and is restrained in circuit closing position only so long as the fusible link 13 is strong enough to hold the blade 12 in the position shown in Fig. 3. As soon as the regulating resistance or regulating lamp is broken the current for the lamps 1 flows through the contacts 3 and 4 and the excessive arcing between the contacts 3 produces so much heat that the fusible link 13 quickly melts, whereupon the resilient blade 12 is released and springs up, quickly and permanently opening the circuit through the regulator and the lamps 1, and preventing damage to the regulator.

It is desirable to provide some means for maintaining the circuit through the lamps 1 if the regulator should become disabled, since such an arrangement will permit the car to be illuminated although the illumination will vary with the voltage on the line. Various means for accomplishing this result may be used, but in the preferred construction the broken regulating lamp is removed and the circuit is completed through another lamp which is connected in series with the four lamps 1, while the regulator is entirely disconnected. In order to enable the regulator to be disconnected, two sockets 15 and 16 are provided, each of which has the bottom cut away, as best shown in Fig. 1, and is traversed by contact blades 17 and 18, which tend to spring out of contact with each other and are out of contact with the sockets, as is best shown in Fig. 4. The socket 15 is connected to the vibratory contact 4 while the contact blade 17 is connected to the resilient blade 12 of the thermal cut out. When the regulating lamp is screwed into the socket 15, the center contact of the lamp engages the blade 17 which is thereby forced into engagement with the blade 18, as shown in Fig. 4, and the lamp completes a high resistance circuit from the vibratory contact 4 to the resilient blade 12, through which current must flow when the contacts 3 and 4 are separated. The socket 16 is connected to the grounded side of the circuit beyond the electromagnet 5, while the contact blade 18 is connected to the four lamps 1. When the regulating lamp 2 is removed from socket 15 the contact blade 17 springs up out of engagement with the blade 18, and the lamp which has been screwed into the socket 16 and into engagement with the blade 18 is thereby connected directly in series between the ground and the four lamps 1, while both the regulator and the socket 15 are entirely disconnected.

My invention may be embodied in many other forms than that shown and described, and I therefore do not wish to restrict it to the precise arrangement shown but intend to cover in the appended claims all changes and modifications within the spirit and scope of my invention.

What I claim as new and desire to secure by Letters Patent of the United States is:

1. In combination, an electric circuit comprising a resistance, electromagnetic means responsive to the voltage impressed upon said circuit for intermittently short-circuiting said resistance, said means comprising a pair of contacts one of which is vibratory, and means thermally responsive to the heat developed by excessive arcing of said contacts for permanently opening said short circuit.

2. The combination with an electric circuit, of a resistance in said circuit, a shunt path connected around said resistance comprising a pair of contacts, one of which is vibratory to intermittently short-circuit said resistance, and means thermally responsive to the heat developed by excessive arcing of said contacts for opening said shunt circuit.

3. In combination, an electric circuit including one or more translating devices, a resistance, a regulator comprising an electromagnetic vibrator the contacts of which are in shunt to said resistance and the electromagnet of which is in series with the contacts and the resistance member, and means thermally responsive to the heat developed by excessive arcing of said contacts for opening said shunt circuit.

In witness whereof, I have hereunto set my hand this 11th day of December 1908.

ARCHIBALD S. CUBITT.

Witnesses:
BENJAMAN B. HULL,
HELEN ORFORD.